United States Patent [19]

Smith et al.

[11] Patent Number: 4,727,290

[45] Date of Patent: Feb. 23, 1988

[54] AUTOMATIC VEHICLE HEADLAMP DIMMING CONTROL

[75] Inventors: Julian N. Smith, Farmington Hills; James M. Lawlis, Troy, both of Mich.

[73] Assignee: General Motors Corporation, Detroit, Mich.

[21] Appl. No.: 55,350

[22] Filed: May 29, 1987

[51] Int. Cl.⁴ ................................ H05B 39/00; B60Q 1/02
[52] U.S. Cl. ................. 250/214 D ... 315/82; 315/77; 315/83; 315/152; 315/154; 315/158; 315/159; 250/200; 250/201; 250/205; 307/10 LS
[58] Field of Search ................ 315/77, 82, 83, 152, 315/153, 154, 156, 158, 159; 307/10 LS; 340/52 R; 250/200, 201, 205, 206

[56] References Cited

U.S. PATENT DOCUMENTS

| 3,177,397 | 4/1965 | Keeran | 315/154 |
|---|---|---|---|
| 3,381,169 | 4/1968 | Brock et al. | 315/83 |
| 3,383,552 | 5/1968 | Brock | 315/83 |
| 3,775,639 | 11/1973 | Woodward | 315/82 |
| 3,925,244 | 12/1975 | Nagasawa et al. | 315/82 |
| 4,339,667 | 7/1982 | Bergmann et al. | 315/82 |
| 4,376,909 | 3/1983 | Tagami et al. | 315/82 |
| 4,599,544 | 7/1986 | Martin | 315/82 |
| 4,613,791 | 9/1986 | Kurihara et al. | 315/82 |
| 4,665,321 | 5/1987 | Chang et al. | 315/82 |
| 4,683,403 | 7/1987 | Iwamoto et al. | 315/82 |

FOREIGN PATENT DOCUMENTS

| 2262612 | 9/1975 | France | 315/82 |
|---|---|---|---|
| 0202945 | 11/1984 | Japan | 315/82 |

Primary Examiner—David K. Moore
Assistant Examiner—Michael J. Nickerson
Attorney, Agent, or Firm—Robert M. Sigler

[57] ABSTRACT

An automatic vehicle headlamp dimming control is the type having an operator controlled first voltage divider across a power supply, a light sensitive resistance connected in electrical series with an electrically controlled variable resistance in a second voltage divider across the output of the first voltage divider, an energizing circuit adapted to energize the headlamp system from the power supply at high or low intensity in response to the output of the second voltage divider compared to a fixed reference voltage and first electric feedback means from the energizing circuit to the electrically controlled variable resistance for producing hysteresis feedback. The invention adds to this control a resistance between the output of the first voltage divider and the second divider to decouple the same, a capacitor in series with the second voltage divider and supply voltage, and second electric feedback means from the energizing circuit to the junction of the capacitor and second voltage divider for causing charging and discharging of the capacitor with switching between high and low headlamp intensity to produce a gradual change in the output of the second voltage divider counter to the hysteresis feedback. The circuit helps reduce the undesirable sensitivity effects of hysteresis feedback, photocell memory and misaligned sensors or headlamps.

2 Claims, 2 Drawing Figures

AUTOMATIC VEHICLE HEADLAMP DIMMING CONTROL

BACKGROUND OF THE INVENTION

This invention relates to the automatic control of vehicle headlamp intensity in response to the sensed light in front of the vehicle. Such sensed light is generally due to the headlamps of oncoming vehicles, although it may also be from the taillamps of vehicles being followed.

Such systems generally include feedback for hysteresis in switching back and forth from low to high beams in response to sensed light, in order to produce sure switching in the normal manner. This hysteresis is immediate upon switching and produces a step change in the sensitivity of the system in the direction to require a significant reversal of light level to cause a switch back to the original state. The control of this invention modifies this hysteresis by allowing the sensitivity to return from the stepped value over time after switching. The control as claimed offers several benefits in system operation, including automatic correction of photocell memory and adjustment of system sensitivity to variations in sensor or headlamp aiming. In its operation, it tends to reduce the need for driver intervention via the driver sensitivity control, which leads to improved driver satisfaction with the system.

SUMMARY OF THE INVENTION

The invention is a control circuit for a vehicle headlamp system having two levels of intensity, the control circuit comprising an electric power supply having a supply voltage, a first voltage divider connected across the supply voltage and having an output, a capacitor, and a light sensitive resistance positioned to sense light from outside and in front of the vehicle, the light sensitive resistance being connected in electrical series with an electrically controlled variable resistance in a second voltage divider in series with the capacitor across the supply voltage, the second voltage divider having an output from the junction of the light sensitive and electrically controlled variable resistances at a control voltage.

It further comprises a fixed resistance connecting the output of the first voltage divider and the junction of the capacitor and second voltage divider and an energizing circuit adapted, when activated to its high beam mode, to energize the headlamp system from the power supply at the higher intensity and, when activated to its low beam mode, to activate the headlamp system at the lower intensity, the energizing circuit being responsive to the output of the second voltage divider to switch the headlamp system to its high beam mode at a control voltage varying in the direction of decreasing sensed light from a reference and further being responsive to the output of the second voltage divider to switch the headlamp system to its low beam mode at control voltages varying in the direction of increasing sensed light from the reference.

It further comprises first electric feedback means from the energizing circuit to the electrically controlled variable resistance for changing the electrically controlled variable resistance immediately in a step-wise manner upon switching of the headlamp system between the high and low beam modes in direction to produce hysteresis in such switching and second electrical feedback means from the energizing circuit to the junction of the capacitor and second voltage divider for allowing the capacitor to gradually change the voltage across the second voltage divider in direction to produce a change in the output thereof counter to that produced by the first electrical feedback means.

DESCRIPTION OF THE PREFERRED EMBODIMENT

Figure 1:
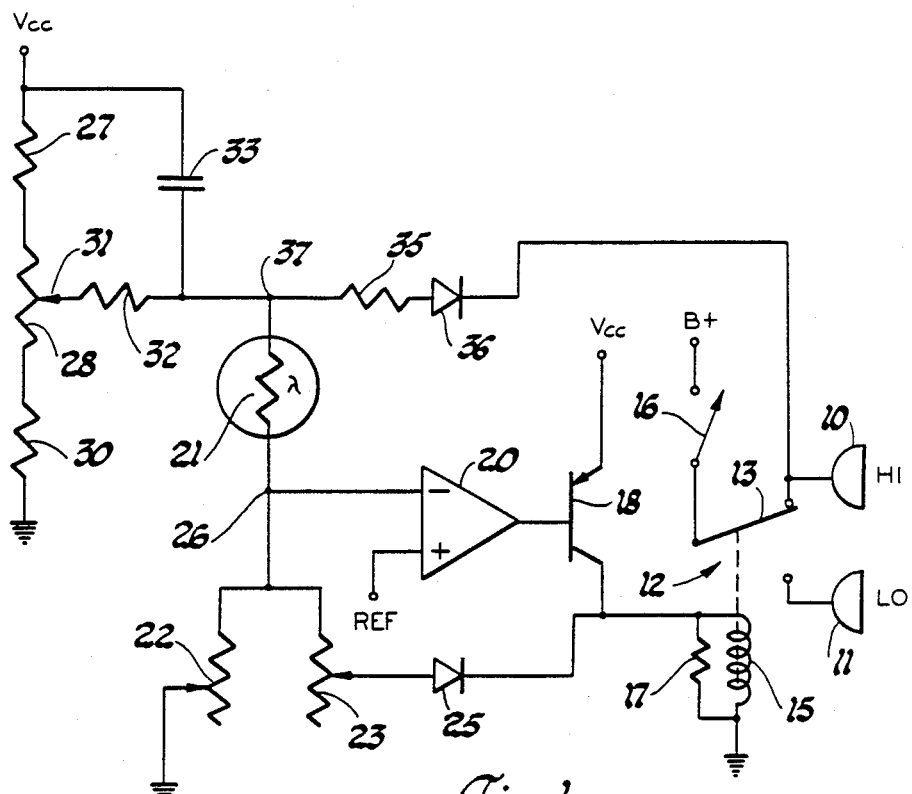
FIG. 1 is a circuit diagram of a preferred embodiment of the invention.

Referring to FIG. 1, a standard vehicle power supply comprises a battery, alternator and voltage regulator represented by a hot terminal labeled B+ and ground. It includes additional voltage regulating apparatus effective to produce a lower voltage $V_{cc}$ suitable for electronic circuit devices such as integrated circuit chips. A vehicle headlamp system is represented by a high beam lamp 10 and low beam lamp 11 connected to the normally closed and normally open contacts of a high beam relay 12 having an armature 13 and activating coil 15. A standard headlamp switch is represented in simplified fashion by switch 16 connected between relay armature 13 and supply B+. With switch 16 closed to activate the headlamps and relay 12 deactivated, the headlamps are powered from supply B+ in the high beam mode, whether this mode energizes one or more separate high beam lamps as shown or separate high beam filaments of high/low beam lamps in an equivalent arrangement. Relay 12 is activated to energize low beam lamp 11. Clearly, the state of activation of relay 12 for high or low beams is one of designer's choice: that shown is for example only, and is not required for the invention.

Relay coil 15 is connected in parallel with a resistor 17, which could also be a free-wheeling diode, between ground and the collector of a PNP bipolar transistor 18 having an emitter connected to $V_{cc}$. The base of transistor 18 is connected to the output of an inverting amplifier or comparator 20 having a non-inverting input connected to a reference voltage REF and an inverting input. Amplifier 20 and transistor 18 represent an amplifying relay driving circuit well known in the art. An example is found in transistors 10, 20, 30, 40 and 50 and their associated components in the circuit shown in U.S. Pat. No. 3,775,639 to Woodward, issued Nov. 27, 1973.

A light sensitive resistance 21 varies inversely with sensed light and is placed on the vehicle in position to sense light in front of the vehicle in the standard manner. Thus, resistance 21 will decrease in response to the headlamps of oncoming vehicles. It will further decrease, at a closer distance, in response to the taillamps of vehicles approached from behind, these lamps being generally lower in intensity and therefore producing less effect in resistance 21 as a headlamp at the same distance. Light sensitive resistor 21 may be a cadmium sulfide photocell. Such an element does not have a fixed resistance at a particular light level. Its resistance depends somewhat on its light exposure history; it has what is commonly referred to as photocell memory. After being in darkness for a significant time, it becomes more sensitive to light, and vice versa. This creates a calibration problem in most circuits of this type; however, as will be seen, the control of this invention compensates for the photocell memory problem.

Light sensitive resistance 21 is connected in electrical series with a variable resistance comprising a potentiometer 22 to ground. It is further connected through a potentiometer 23 and a diode 25 to the collector of transistor 18. The junction 26 of light sensitive resistance 21 and potentiometer 22 is connected to the inverting input of amplifier 20. When transistor 18 is not conducting, diode 25 provides a current path from light sensitive resistor 21 through potentiometer 23 and the parallel combination of resistor 17 and coil 15 to ground, in parallel with potentiometer 22. When transistor 18 is conducting, however, diode 25 is reverse biased, and the variable resistance from light sensitive resistance 21 to ground effectively comprises potentiometer 22 only (neglecting the very high input impedance of amplifier 20). The variable resistance from light sensitive resistance 21 to ground is thus controlled by transistor 18 to be greater when transistor 18 is conducting than when it is not conducting.

Light sensitive resistance 21 and the variable resistance comprising potentiometers 22 and 23, diode 25 and resistance 17 form a voltage divider having an output at junction 26, which, as already mentioned, is connected to the inverting input of amplifier 20. Diode 25 thus provides hysteresis feedback with respect to the sensitivity to light sensed by light sensitive resistance 21. If the voltage on junction 26 becomes high enough to turn on transistor 18 through amplifier 20, diode 25 becomes reverse biased and causes an increase in the variable resistance and thus the voltage on junction 26, which turns on transistor 18 even harder and requires a decrease in the voltage at junction 26 past that at which transistor 18 turned on in order to turn transistor 18 off. The opposite occurs when the voltage on junction 26 falls low enough to turn off transistor 18. This is standard practice in such systems to provide sure switching, with no oscillation back and forth between high and low beams with sensed light intensities that remain right around the switching level.

Another voltage divider comprises resistors 27 (2.5K), 28 (6.1K) and 30 (5.0K) connected in series between voltage $V_{cc}$ and ground. Resistor 28 has a variable resistance tap 31 providing an output of the voltage divider, which is connected through a fixed resistance 32 (1M) to junction 37 at the end of light sensitive resistance 21 opposite junction 26. Junction 37 is further connected to $V_{cc}$ through a capacitor 33 (5.6 μF) and to the normally closed contact of relay 12 at high beam lamp 10 through a resistance 35 (1M) and diode 36. The other voltage divider (27, 28, 30) and variable tap 31 comprise the standard operator sensitivity control, with variable tap 31 attached to an operator controlled device on the vehicle dashboard for adjusting the voltage supplied to the voltage divider, already described, which includes light sensitive resistance 21 and controls amplifier 20. Capacitor 33 is added by this invention; and the resistance 32 is made much larger than similar resistances in prior art circuits in order to decouple junction 37 of capacitor 33 and light sensitive resistor 21 from tap 31 and allow capacitor 33 to change its voltage at a slow rate. In addition, the current path comprising resistance 35 and diode 36 is added by this invention and comprises a second feedback means for the circuit which acts, with a delay controlled by capacitor 33, counter to the hysteresis feedback means comprising diode 25.

When high beam lamp 10 is energized, diode 36 is reverse biased; and the voltage on junction 37 is allowed to increase toward the voltage on tap 31 of the voltage divider comprising resistances 27, 28 and 30. This is accomplished by capacitor 33 discharging through the large resistance 32 to $V_{cc}$. Thus, a slow upward voltage ramp may be obtained on junction 37, which causes a similar slow downward voltage ramp on junction 26 following the upward step in the voltage on junction 26 upon the switching of transistor 18. When relay 12 is activated to energize low beam lamp 11, however, the voltage on junction 37 is allowed to decrease toward the voltage on tap 31 times resistance 35 divided by the sum of resistances 35 and 32. Capacitor 37 charges from ground through three parallel high resistance paths: resistance 32, resistance 35 and light sensitive resistance 21. Thus a slow downward voltage ramp is also achieved on junction 37, which causes a similar slow downward ramp in the voltage on junction 26 following the upward step in voltage on junction 26 on the switching of transistor 18. Thus, the control provides an immediate feedback change in light sensitivity for hysteresis to prevent uncertain switching between high and low beams, but thereafter automatically reverses this sensitivity change to provide the sensitivity which is desired for reasons other than clean switching.

Briefly, the entire control operates as follows. Assuming that the vehicle is being operated at night with no oncoming vehicle, light sensitive resistance 21 is in darkness and has a high resistance value. The inverting input of amplifier 20 is lower than REF; and the output of amplifier 20 is high. Transistor 18 is non-conducting; and relay 12 is deactivated to energize high beam lamp 10 and reverse bias diode 36. A predetermined, fixed voltage at the inverting input of amplifier 20 is required to switch the control to energize the low beam lamp 11. However, the light level necessary to produce this voltage varies over time. As light sensitive resistance 21 spends more time in darkness, its resistance tends to increase to lower the voltage at the inverting input of amplifier 20 at the same light level. Thus a lower light level would be required to switch amplifier 20. However, at the same time, capacitor 33 is discharging, so that the voltage at junction 37 increases toward a maximum determined partly by the operator set voltage of tap 31. In addition, the increase in light sensitive resistance 21 causes a smaller current flow through resistance 32, which produces a smaller voltage drop from tap 31 to junction 37 and a higher voltage on junction 37. These factors tend to at least partially counteract the photocell memory problem.

When the light from an oncoming vehicle causes amplifier 20 to switch, transistor 18 turns on to activate relay 12 and energize low beam lamp 11. The immediate feedback through diode 25, as it becomes reverse biased to take resistor 17 and coil 15 out of the voltage divider controlling amplifier 20, causes an increase in voltage at junction 26 to provide hysteresis and prevent switching uncertainty. In addition, light sensitive resistance 21 begins to decrease its resistance value, which, over time, would further increase the voltage on junction 26. However, diode 36 now allows capacitor 33 to charge through resistor 35, which tends to decrease the voltage on junction 37 toward a minimum determined partly by the operator set position of tap 31 and the relative resistances 32 and 35. This also tends to reduce the voltage on junction 26. In addition, as light sensitive resistance 21 decreases with exposure to light, more current flows through resistor 32; and this tends to further decrease the voltage on junctions 37 and 26.

Figure 2:
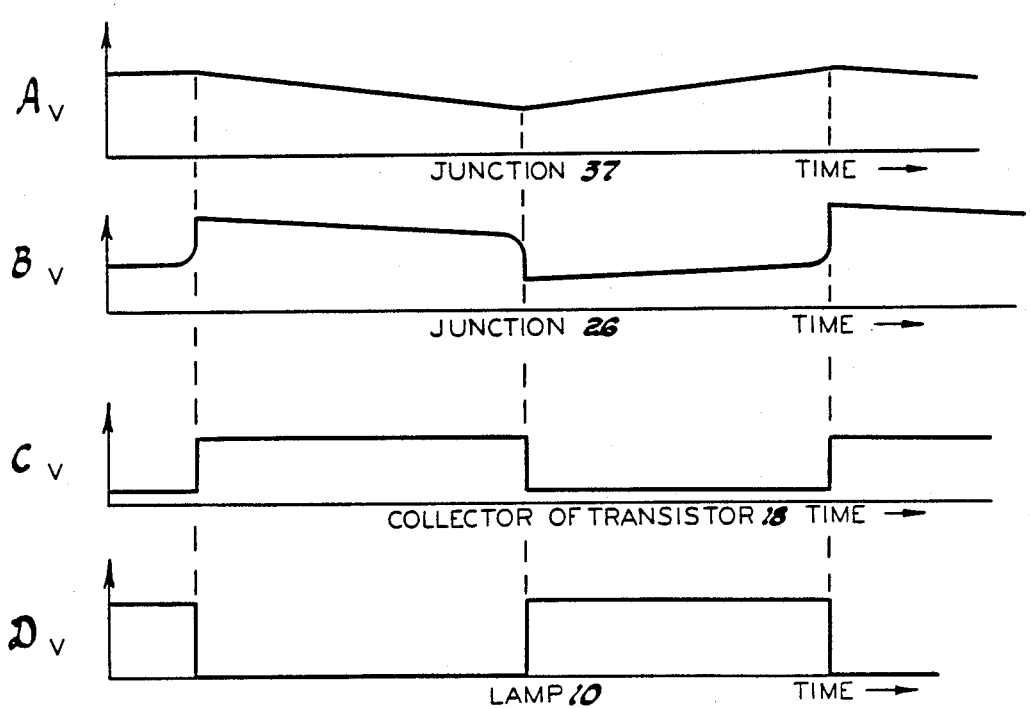
FIG. 2 shows several waveforms of voltage vs. time illustrating the operation of the circuit of FIG. 1.

The operation described above may be seen in the curves of FIG. 2. FIGS. 2C and 2D show the voltages at the collector of transistor 18 and the non-grounded terminal of lamp 10 respectively. The vertical dashed lines represent switching points: the first and third from high to beam and the second from low to high beam, as may be seen in the behavior of the curve of FIG. 2D. The voltage on junction 37 is shown in FIG. 2A to ramp upward and downward in response to the change in bias of diode 36 by the voltage shown in FIG. 2D as the beams are switched. FIG. 2B shows the voltage on junction 26, which is affected by the change in resistance to ground produced in response to the voltage of FIG. 2C as the lamps are switched, the ramping of the voltage of FIG. 2A and the change in light sensitive resistance 21. In the curve of FIG. 2B, the first of these is shown in the steps at the switching points, the second by the ramping following the steps and the third by the short curved sections going into the switching points as a vehicle with headlamps comes within range or passes.

In the design of the circuit described above, the value of resistance 32 is calculated to produce the desired amount of sensitivity compensation. Capacitor 33 is selected to produce the desired time fro the voltage on junction 37 to increase to its maximum in high beam mode. Potentiometer 23 is adjusted to produce the minimum voltage in low beam mode, which is also affected by the driver selected position of tap 31. Since capacitor 30 is connected from junction 37 to the B+ terminal, when switch 16 is first closed the voltage on junction 37 will at first be high ($V_{cc}$) and the headlamps will always first turn on in low beam mode.

Thus, it can be seen that the vehicle lamp control of this invention automatically corrects for the undesirable sensitivity effects of hysteresis feedback, photocell memory and misaligned sensors or headlamps. This is accomplished with the addition of a few inexpensive circuit elements. Although not replacing the operator sensitivity control, by correcting these undesirable effects, it provides a reduction in the perceived need by the operator to adjust the sensitivity and therefore creates more operator satisfaction with the system.

The embodiments of the invention in which an exclusive property or privilege is claimed are defined as follows:

1. A control circuit for a vehicle headlamp system having two levels of intensity comprising, in combination:
   an electric power supply having a supply voltage;
   a first voltage divider connected across the supply voltage and having an output;
   a capacitor;
   a light sensitive resistance positioned to sense light from outside and in front of the vehicle, the light sensitive resistance being connected in electrical series with an electrically controlled variable resistance in a second voltage divider in series with the capacitor across the supply voltage, the second voltage divider having an output from the junction of the light sensitive and electrically controlled variable resistances at a control voltage;
   a fixed resistance connecting the output of the first voltage divider and the junction of the capacitor and second voltage divider;
   an energizing circuit adapted, when activated to its high beam mode, to energize the headlamp system from the power supply at the higher intensity and, when activated to its low beam mode, to activate the headlamp system at the lower intensity, the energizing circuit being responsive to the output of the second voltage divider to switch the headlamp system to its high beam mode at a control voltage varying in the direction of decreasing sensed light from a reference voltage and further being responsive to the output of the second voltage divider to switch the headlamp system to its low beam mode at control voltages varying in the direction of increasing sensed light from the reference voltage;
   first electric feedback means from the energizing circuit to the electrically controlled variable resistance for changing the electrically controlled variable resistance immediately in a step-wise manner upon switching of the headlamp system between the high and low beam modes in direction to produce hysteresis in such switching; and
   second electric feedback means from the energizing circuit to the junction of the capacitor and second voltage divider for gradually changing the voltage at the junction of the capacitor and the second voltage divider in direction to produce a gradual change in the output of the second voltage divider counter to that produced by the first electrical feedback means.

2. A control circuit for a vehicle headlamp system having two levels of intensity comprising, in combination:
   an electric power supply having an energizing terminal at a supply voltage and a common return;
   a first voltage divider connected across the supply voltage and having an output at an intermediate voltage;
   a light sensitive resistance positioned to sense light from outside and in front of the vehicle, the light sensitive resistance varying inversely with sensed light and being connected in electrical series between a fixed resistance and an electrically controlled variable resistance in a second voltage divider across the intermediate voltage, the second voltage divider having an output from the junction of the light sensitive and electrically controlled variable resistances;
   a capacitor connected from the supply terminal to the junction of the fixed and light sensitive resistances;
   an energizing circuit adapted, when activated to its high beam mode, to energize the headlamp system from the power supply at the higher intensity and, when activated to its low beam mode, to activate the headlamp system at the lower intensity, the energizing circuit being responsive to the output of the second voltage divider to switch the headlamp system to its high beam mode at a control voltage varying in the direction of decreasing sensed light from a reference and further being responsive to the output of the second voltage divider to switch the headlamp system to its low beam mode at control voltages varying in the direction of increasing sensed light from the reference;
   first electric feedback means from the energizing circuit to the electrically controlled variable resistance for increasing the electrically controlled variable resistance with the headlamp system in its low beam mode and decreasing the electrically controlled variable resistance with the headlamp system in its high beam mode, whereby the system sensitivity to sensed light is immediately changed upon switching between modes in a direction to produce hysteresis; and second electric feedback means from the energizing circuit to the junction of the light sensitive resistor, fixed resistor and capacitor for allowing the capacitor to charge and the voltage at the junction to move away from the intermediate and supply voltages when the headlamp system is in its low beam mode and for allowing the capacitor to discharge and the voltage at the junction to move toward the intermediate voltage when the headlamp system is in its high beam mode, whereby system sensitivity to light is gradually changed after switching between modes in the direction counter to that producing hysteresis.

* * * * *